(12) United States Patent
Nishida et al.

(10) Patent No.: US 7,249,467 B2
(45) Date of Patent: Jul. 31, 2007

(54) GAS-LIQUID SEPARATOR FOR REFRIGERANT CYCLE SYSTEM

(75) Inventors: Shin Nishida, Kariya (JP); Syuichi Mizuno, Kariya (JP); Hiroki Naganawa, Kariya (JP)

(73) Assignee: DENSO Corporation, Kariya (JP)

( * ) Notice: Subject to any disclaimer, the term of this patent is extended or adjusted under 35 U.S.C. 154(b) by 370 days.

(21) Appl. No.: 10/855,916

(22) Filed: May 27, 2004

(65) Prior Publication Data

US 2004/0237577 A1    Dec. 2, 2004

(30) Foreign Application Priority Data

May 29, 2003    (JP)  ............... 2003-153104

(51) Int. Cl.
*F25B 43/00*    (2006.01)

(52) U.S. Cl. ............... 62/503; 62/84; 62/83; 62/470; 62/239

(58) Field of Classification Search .......... 62/83, 62/503, 239
See application file for complete search history.

(56) References Cited

U.S. PATENT DOCUMENTS 5,036,679 A * 8/1991 Zlobinsky et al. ........... 62/470

5,505,060 A * 4/1996 Kozinski .................... 62/503
6,966,199 B2 * 11/2005 Takeuchi .................... 62/500

FOREIGN PATENT DOCUMENTS

| JP | 4-8059 | 1/1992 |
|---|---|---|
| JP | 9-178276 | 7/1997 |
| JP | 9-250848 | 9/1997 |
| JP | 2001-289539 | 10/2001 |

* cited by examiner

*Primary Examiner*—Cheryl Tyler
*Assistant Examiner*—John Pettitt
(74) *Attorney, Agent, or Firm*—Harness, Dickey & Pierce, PLC

(57) ABSTRACT

A gas-liquid separator (accumulator) is arranged at a refrigerant suction side of a compressor of a refrigerant cycle system mounted in a vehicle. The gas-liquid separator includes a gas-liquid separation portion for separating refrigerant into gas refrigerant and liquid refrigerant, and a liquid refrigerant storage portion for storing therein the separated liquid refrigerant. In the gas-liquid separator, the gas-liquid separation portion is arranged approximately vertically, and the liquid refrigerant storage portion is arranged approximately horizontally with respect to the approximately vertically arranged gas-liquid separation portion. Therefore, mounting performance of the gas-liquid separator in the vehicle can be effectively improved while gas-liquid separation can be accurately performed.

13 Claims, 6 Drawing Sheets

GAS-LIQUID SEPARATOR FOR REFRIGERANT CYCLE SYSTEM

CROSS REFERENCE TO RELATED APPLICATION

This application is based on Japanese Patent Application No. 2003-153104 filed on May 29, 2003, the disclosure of which is incorporated herein by reference.

FIELD OF THE INVENTION

The present invention relates to a gas-liquid separator (accumulator) that is disposed at a suction side of a compressor in a refrigerant cycle system mounted on a vehicle, to separate refrigerant into gas refrigerant and liquid refrigerant and to store the separated liquid refrigerant therein.

BACKGROUND OF THE INVENTION

In a conventional refrigerant cycle system of a vehicle air conditioner, an accumulator for separating refrigerant into gas refrigerant and liquid refrigerant and for storing the separated liquid refrigerant is generally mounted in an engine compartment, together with a compressor and a condenser. In order to reduce the side of the accumulator while the gas-liquid separation can be sufficiently performed, in an accumulator described in JP-A-2001-289539, a cylindrical tank body portion is formed so that refrigerant introduced from a refrigerant inlet portion flows into the tank body portion while being turned along an inner wall of the tank body portion.

Recently, a crushable zone is provided as a vehicle front structure in order to improve safety performance in a vehicle collision. Further, components such as the accumulator and the condenser are generally mounted in the engine compartment at a vehicle front side around the crushable zone. In order to. install the accumulator without interfering with the crushable zone while a total capacity of the accumulator is not changed, it is necessary to enlarge the vertical dimension of the accumulator. However, when the vertical dimension of the accumulator is higher than a predetermined dimension, the accumulator may interfere with a vehicle reinforcement member in the vehicle collision.

SUMMARY OF THE INVENTION

In view of the above-described problems, it is an object of the present invention to provide a gas-liquid separator (accumulator) that can be readily mounted on a vehicle so as to improve mounting performance in a vehicle. It is another object of the present invention to provide a refrigerant cycle system having the gas-liquid separator.

According to the present invention, a gas-liquid separator for a refrigerant cycle system of a vehicle includes a gas-liquid separation portion disposed substantially vertically for separating refrigerant flowing therein into gas refrigerant and liquid refrigerant, and a liquid refrigerant storage portion which stores the liquid refrigerant separated by the gas-liquid separation portion. In the gas-liquid separator, the liquid refrigerant storage portion is disposed such that the liquid refrigerant is generally horizontally stored in the liquid refrigerant storage portion with respect to the gas-liquid separation portion disposed substantially vertically. Therefore, it is possible to effectively reduce a height dimension of the gas-liquid separation portion because the liquid refrigerant can be stored in the liquid refrigerant storage portion. Thus, a dimension of the gas-liquid separator in a vehicle front-rear direction can be reduced while a necessary capacity of the gas-liquid separator can be maintained. As a result, the gas-liquid separator can be readily mounted without interfering with a crushable zone on a vehicle front side and a vehicle reinforcing member. For example, the gas-liquid separation portion is disposed at a suction side of a compressor of the refrigerant cycle system mounted on the vehicle.

Preferably, the gas-liquid separation portion extends substantially in a vertical direction, the liquid refrigerant storage portion extends substantially in a horizontal direction, and one end portion of the liquid refrigerant storage portion is integrally connected to a lower end portion of the gas-liquid separation portion. Because the gas-liquid separation portion extends in the vertical direction, the gas-liquid separation can be readily performed by its weight difference of the gas refrigerant and the liquid refrigerant. Specifically, a necessary height H of the gas-liquid separation portion in an extension direction of the gas-liquid separation portion and a total length L of the liquid refrigerant storage portion in an extension direction of the liquid refrigerant storage portion are set to have the following relationship of $H \times \cos\theta \geq L \times \tan\theta$, in which $\theta$ is a slant angle of the vehicle. In this case, even when the vehicle is slanted by the slant angle $\theta$, the gas-liquid separation can be readily accurately performed, and it can prevent the liquid refrigerant from flowing from a gas refrigerant outlet of the gas-liquid separation portion.

An axial center of the gas-liquid separation portion can be shifted from that of the liquid refrigerant storage portion in a vehicle front-rear direction. In this case, the gas-liquid separation portion is arranged adjacent to a side surface of a condenser that is provided at a discharge side of the compressor, and the liquid refrigerant storage portion is arranged on a front side of the condenser. Further, the gas-liquid separation portion and the liquid refrigerant storage portion can be integrated through a communication member.

Further, the gas-liquid separator can be used for the refrigerant cycle system having an ejector for decompressing refrigerant while sucking gas refrigerant evaporated in an evaporator. In this case, the gas-liquid separator has a liquid refrigerant outlet portion through which the liquid refrigerant separated in the gas-liquid separation portion is introduced into the evaporator. For example, the liquid refrigerant outlet portion is provided in the gas-liquid separation portion to be positioned around a bottom end of the liquid refrigerant storage portion or lower than the bottom end of the liquid refrigerant storage portion. Alternatively, the liquid refrigerant outlet portion is provided at a lower end portion of the liquid refrigerant storage portion.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

Figure 1:
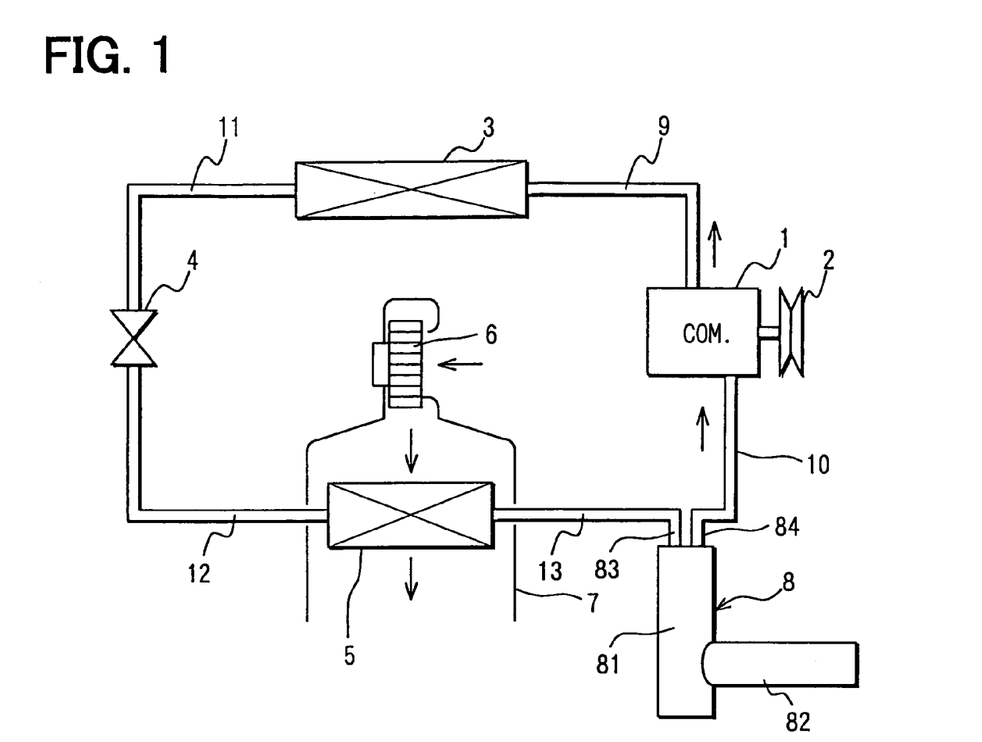
FIG. 1 is a schematic diagram of a refrigerant cycle system in which a gas-liquid separator (accumulator) of the present invention is used.

The first embodiment of the present invention will be now described with reference to FIGS. 1-4. As shown in FIG. 1, a compressor 1 is driven by a vehicle engine through an electromagnetic clutch 2. High-pressure gas refrigerant discharged from the compressor 1 flows into a condenser 3 (cooler), and is heat-exchanged with outside air to be cooled and condensed.

Liquid refrigerant condensed in the condenser 3 is decompressed in a decompression device 4 to a low pressure, so that gas-liquid two-phase refrigerant is obtained. As the decompression device 4, a fixed throttle such as an orifice, a nozzle, a capillary tube can be used. Alternatively, as the decompression device 4, a variable throttle such as a thermal expansion valve and an electric expansion valve can be used. Low-pressure refrigerant after being decompressed in the decompression device 4 is evaporated in the evaporator 5 by absorbing heat from air blown by an air-conditioning blower 6.

The evaporator 5 is disposed in an air conditioning case 7 for defining an air passage through which air flows into a passenger compartment of the vehicle. A heater core for heating air is disposed in the air conditioning case 7 downstream of the evaporator 5. Therefore, air cooled in the evaporator 5 is heated in the heater core, so that conditioned air having a desired temperature is blown into the passenger compartment. The refrigerant after passing through the evaporator 5 flows into a gas-liquid separator 8 (accumulator), and gas refrigerant separated from liquid refrigerant in the gas-liquid separator 8 is drawn into a refrigerant suction side of the compressor 1.

The gas-liquid separator 8 separates refrigerant from the evaporator 5 into gas refrigerant and liquid refrigerant. Further, the separated gas refrigerant in the gas-liquid separator 8 is drawn into the suction side of the compressor 1, and the separated liquid refrigerant in the gas-liquid separator 8 is stored therein. In addition, oil contained in the liquid refrigerant on a bottom side of the gas-liquid separator 8 is also drawn into the suction side of the compressor 1.

Generally, the compressor 1 is mounted on a side of the vehicle engine in the vehicle, and the other components 3, 4, 5 and 8 are mounted on a vehicle body side. Therefore, a vibration type of the compressor 1 is generally different from that of the components 3, 4, 5 and 8 in the refrigerant cycle system. Therefore, rubber hoses 9, 10 having a high elasticity is provided between a discharge portion of the compressor 1 and an inlet side of the condenser 3, and between a suction port of the compressor 1 and the gas-liquid separator 8, to absorb a displacement between different vibration types. In contrast, because the components 3, 4, 5, 8 are mounted on the vehicle body side and are in the same vibration type, refrigerant pipes 11-13 between the components 3, 4, 5, 8 are constructed of metal pipes such as aluminum pipes.

Figure 2:
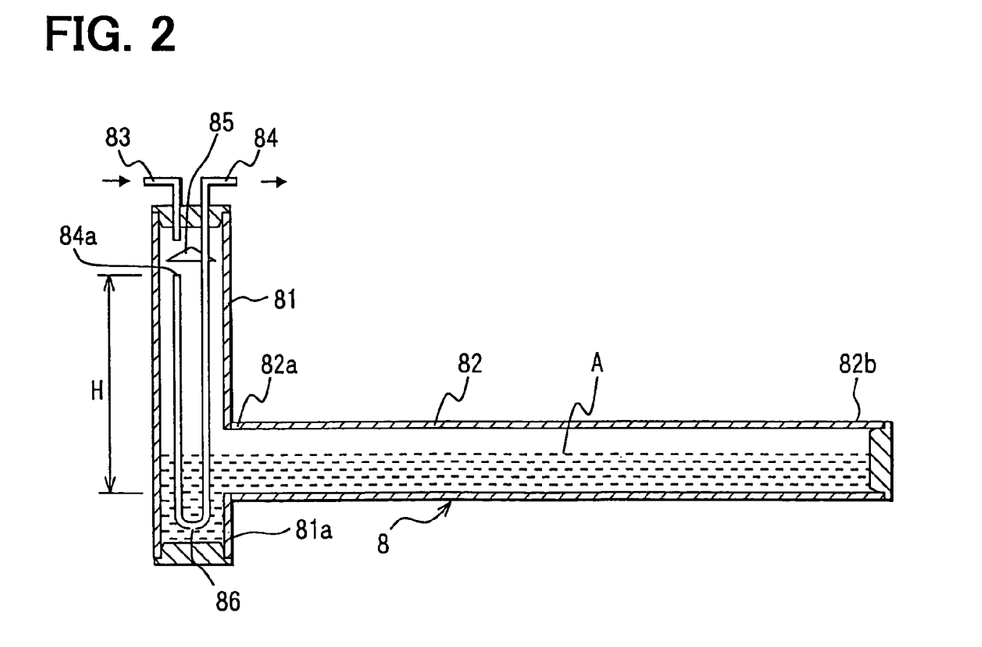
FIG. 2 is a vertical sectional view showing an entire structure of the gas-liquid separator according to a first embodiment of the present invention.

FIG. 2 shows a specific structure of the gas-liquid separator 8. As shown in FIG. 2, the gas-liquid separator 8 includes a gas-liquid separation portion 81 for separating refrigerant flowing from the outlet of the evaporator 5 into gas refrigerant and liquid refrigerant, and a liquid refrigerant storage portion 82 in which the liquid refrigerant separated by the gas-liquid separation portion 81 is stored.

The gas-liquid separation portion 81 is made of metal such as aluminum, and is formed into a cylindrical shape elongated approximately in the vertical direction. A refrigerant inlet portion 83 having a pipe shape is disposed at an upper portion of the gas-liquid separation portion 81. Through the refrigerant inlet portion 83, refrigerant from the outlet of the evaporator 5 flows into the gas-liquid separation portion 81. More specifically, the refrigerant inlet portion 83 is disposed at an upper side of a collision member 85 disposed within the gas-liquid separation portion 81, so that refrigerant flowing from the refrigerant inlet portion 83 collides with the collision member 85. In this embodiment, the collision member 85 has an umbrella shape, for example.

The gas and liquid mixed refrigerant collides with the collision member 85, and the flow speed of the refrigerant is rapidly reduced by the collision with the collision member 85. Therefore, gas-liquid separation of the refrigerant can be facilitated by its weight in the gas-liquid separation portion 81.

A gas refrigerant outlet portion 84 having a pipe shape is provided at one side of the upper portion of the gas-liquid separation portion 81. As shown in FIG. 2, the gas refrigerant outlet portion 84 has an approximate U shape. An upstream end of the U-shaped gas refrigerant outlet portion 84 is opened to have an opening portion 84a at a lower side position of the collision member 85, and an oil returning hole 86 is provided in a bottom portion of the U-shaped gas refrigerant outlet portion 84. Further, a downstream end of the gas refrigerant outlet portion 84 is connected to the suction side of the compressor 1. Therefore, gas refrigerant around the lower side position of the collision member 85 is sucked from the opening portion 84a of the gas refrigerant outlet portion 84, and is introduced into the suction side of the compressor 1.

In addition, the oil returning hole 86 is provided in the bottom portion of the gas refrigerant outlet portion 84. Therefore, liquid refrigerant containing the oil can be introduced into the gas refrigerant outlet portion 84 through the oil returning hole 86. Generally, each of the refrigerant inlet portion 83 and the gas refrigerant outlet portion 84 is made of metal such as aluminum, and is formed into a pipe shape.

Then, the refrigerant inlet portion 83 and the gas refrigerant outlet, portion 84 are fixed to arrangement hole portions of the gas-liquid separation portion 81.

The liquid refrigerant storage portion 82 is formed into an approximate cylindrical shape extending approximately horizontally, and is made of metal such as aluminum. The liquid refrigerant storage portion 82 has an opened end portion 82a at one side, and a closed end portion 82b at the other end side. The opened end portion 82a of the liquid refrigerant storage portion 82 is connected to a lower end portion 81a of the gas-liquid separation portion 81 by bonding means such as welding, so that a height dimension H between the opening portion 84a opened in the gas-liquid separation portion 81 and a bottom end of the liquid refrigerant storage portion 82 can be obtained and that a cup-shaped bottom end part extends below the opened end portion 82a as shown in FIG. 2.

Further, in this embodiment, the gas-liquid separation portion 81 and the liquid refrigerant storage portion 82 are connected such that an axial center of the gas-liquid separation portion 81 and an axial center of the liquid refrigerant storage portion 82 are placed on the same surface. Further, in this embodiment, the height H is a necessary height H in an extension direction (e.g., vertical direction) of the gas-liquid separation portion 81, for sufficiently performing a gas-liquid separation in the gas-liquid separation portion 81.

Figure 3:
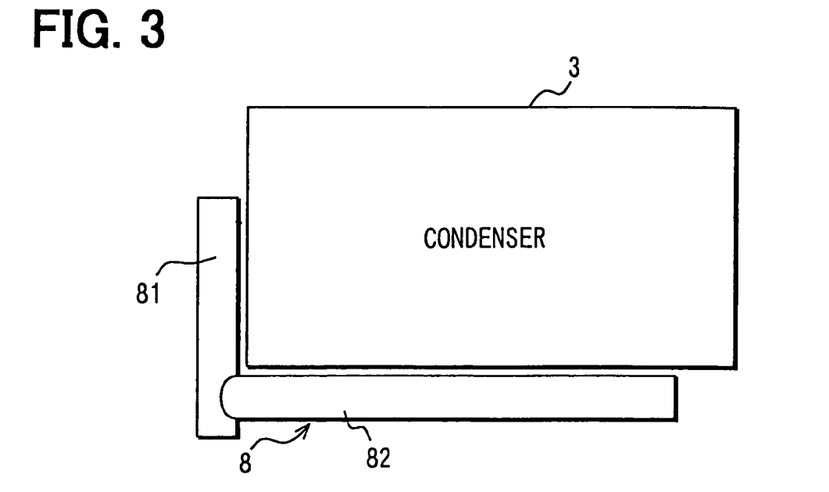
FIG. 3 is a schematic view showing a mounting state of the gas-liquid separator in a vehicle, according to the first embodiment.

In the first embodiment, the gas-liquid separator 8 is mounted in the engine compartment of the vehicle. As shown in FIG. 3, the gas-liquid separator 8 is fixed to the condenser 3 and is connected to the suction side of the compressor 1 such that the gas-liquid separation portion 81 is positioned on one side of a side surface and the liquid refrigerant storage portion 82 is positioned on the bottom side of the condenser 3.

Next, the operation of the gas-liquid separator 8 according to the first embodiment will be now described. When the refrigerant cycle system in FIG. 1 is operated, gas and liquid mixed refrigerant having passed through the evaporator 5 flows into the upper side of the collision member 85 in the gas-liquid separation portion 81 from the refrigerant inlet portion 83. At this time, the refrigerant flowing into the gas-liquid separation portion 81 from the refrigerant inlet portion 83 collides with the collision member 85, and its flow speed reduces rapidly. Therefore, the refrigerant can be readily separated into gas refrigerant and liquid refrigerant due to the weight difference between the gas refrigerant and liquid refrigerant. That is, because the flow speed of the refrigerant becomes rapidly lower by the collision, the weight difference between the gas refrigerant and the liquid refrigerant can be readily applied to the gas-liquid separation. The separated liquid refrigerant falls to the lower end portion 81a of the gas-liquid separation portion 81 and the liquid refrigerant storage portion 82 by its weight.

Accordingly, the liquid refrigerant stores in the lower end portion 81a of the gas-liquid separation portion 81 and the liquid refrigerant storage portion 82, and a boundary surface A (gas-liquid separation surface) is formed at a lower side of the collision member 85. Therefore, gas refrigerant is stored at the upper side in the gas-liquid separation portion 81, and is introduced to a suction side of the compressor 1 from the opening portion 84a through the gas refrigerant outlet portion 84.

When the vehicle is in a stationary state, the liquid refrigerant storage portion 82 is maintained in an approximate horizontal state. That is, the liquid refrigerant storage portion 82 extends approximately in a horizontal direction. At this time, the boundary surface A between the gas refrigerant and the liquid refrigerant is not biased. Therefore, the gas and liquid separation can be suitably performed, so that gas refrigerant can be readily introduced to the upper side of the gas-liquid separation portion 81 and the liquid refrigerant can be readily stored under the boundary surface A in the gas-liquid separation portion 81 and the liquid refrigerant storage portion 82.

Figure 4:
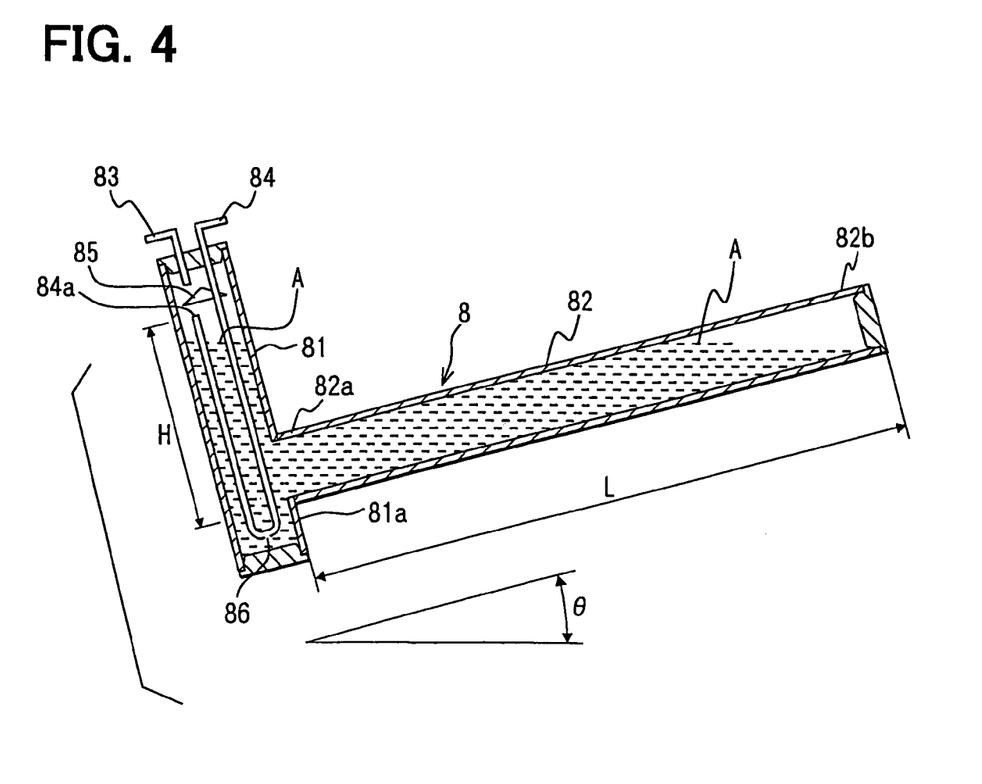
FIG. 4 is a schematic sectional view for explaining a necessary height H that is necessary for a gas-liquid separation of the gas-liquid separator according to the first embodiment.

In contrast, as shown in FIG. 4, when the vehicle is slanted in a vehicle right-left direction by a slant angle θ, the boundary surface A is biased. As shown in FIG. 4, the boundary surface A is generated on a side of the other end portion 82b of the liquid refrigerant storage portion 82 and an upper side in the gas-liquid separation portion 81. The boundary surface A in the gas-liquid separation portion 81 is moved to be close to the opening portion 84a. However, in the first embodiment, the gas-liquid separation portion 81 and the liquid refrigerant storage portion 82 are constructed so that the extension dimension of the gas-liquid separation portion 81 between the opening portion 84a and the bottom end of the liquid refrigerant storage portion 82 has at least the necessary height H. Accordingly, even when the vehicle is tilted, it can prevent liquid refrigerant from being introduced from the opening portion 84a. As a result, only gas refrigerant can be introduced to the suction side of the compressor 1 from the opening portion 84a.

In the first embodiment, the necessary height H for the gas-liquid separation can be calculated by using the following formula (1)

$$H \times \cos\theta \geq L \times \tan\theta \qquad (1)$$

Wherein, H is the extension dimension of the gas-liquid separation portion 81 between the opening portion 84a and the bottom end of the liquid refrigerant storage portion 82, and L is the total length of the liquid refrigerant storage portion 82 in the extension direction of the liquid refrigerant storage portion 82, and θ is a slant angle of the vehicle.

When the maximum slant angle θ is set 15° for example, the necessary height H can be calculated based on the total length of the liquid refrigerant storage portion 82 in accordance with the formula (1). Thus, the position of the opening portion 84a can be set to be vertically separated from the bottom end of the liquid refrigerant storage portion 82. Accordingly, even when the boundary surface A is moved to the upper side of the gas-liquid separation portion 81 when the vehicle is tilted, it can prevent the liquid refrigerant from being introduced into the opening portion 84a.

When the vehicle is slanted to a side opposite to that in FIG. 4 so that the other end portion of the liquid refrigerant storage portion 82 is tilted to a lower side from the gas-liquid separation portion 81, the boundary surface A is mot moved to the upper side of the gas-liquid separation portion 81. In this case, the gas refrigerant can be readily introduced to the upper side of the gas-liquid separation portion 81.

In the gas-liquid separator 8 of the first embodiment, the laterally elongated liquid refrigerant storage portion 82 stores the liquid refrigerant approximately horizontally relative to the gas-liquid separation portion 81 extending approximately vertically. Further, the gas-liquid separation portion 81 is arranged substantially vertically with respect to the bottom end of the liquid refrigerant storage portion 82. Thus, in the gas-liquid separator 8, the receiving capacity of the surplus liquid refrigerant can be readily obtained while the height dimension of the gas-liquid separation portion 81 can be effectively reduced.

Further, the dimension of the gas-liquid separator 8 in the vehicle front-rear direction can be made smaller. Therefore, the gas-liquid separator 8 can be readily mounted in the engine compartment without interfering with a crushable zone and a vehicle reinforcing member.

Further, the necessary height H of the gas-liquid separation portion 81, the total length L of the liquid refrigerant storage portion 82 and the slant angle θ are set so as to have the following relationship of H×cosθ≧L×tanθ. In this case, the gas-liquid separation can be accurately performed and it can prevent the liquid refrigerant from being introduced into the opening portion 84a, while the size of the gas-liquid separator 8 can be effectively reduced.

In addition, the gas-liquid separation portion 81 of the gas-liquid separator 8 disposed at the suction side of the compressor 1 is arranged on the one surface side of the condenser 3, and the liquid refrigerant storage portion 82 is arranged on the bottom end surface side of the condenser 3. Therefore, when the gas-liquid separator 8 is mounted in the engine compartment, the gas-liquid separator 8 does not protrude to a front surface of the condenser 3. Therefore, it can prevent the gas-liquid separator 8 from interfering with the crushable zone when being mounted in the engine compartment, and the mounting performance of the gas-liquid separator 8 can be improved.

Second Embodiment

Figure 5A:
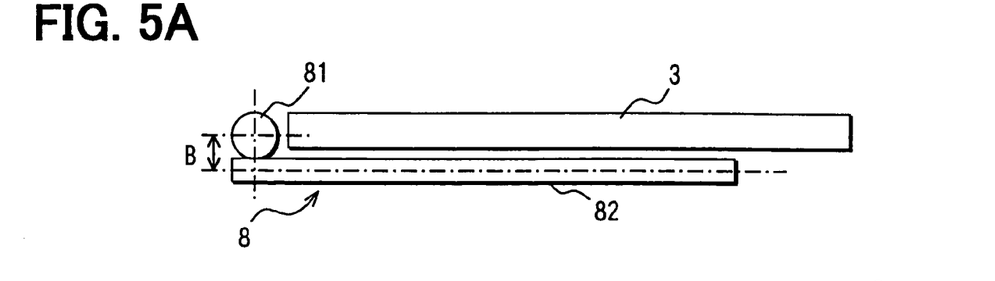
FIG. 5A and FIG. 5B are a top view and a front view showing a mounting state of a gas-liquid separator according to a second embodiment of the present invention.
Figure 5B:
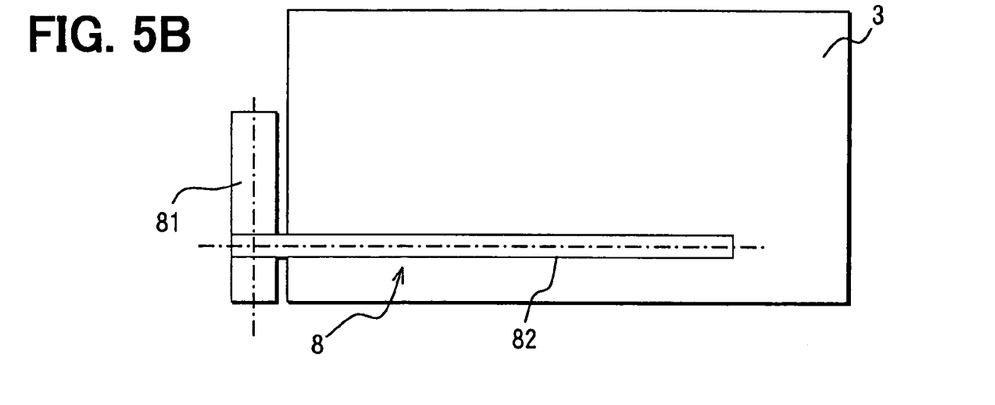

The second embodiment of the present invention will be now described with reference to FIGS. 5A and 5B. In the above-described first embodiment, the gas-liquid separation portion 81 and the liquid refrigerant storage portion 82 are constructed so that its axial centers are placed on the same surface. However, the axial centers of the gas-liquid separation portion 81 and the liquid refrigerant storage portion 82 can be shifted in the vehicle front-rear direction while the gas-liquid separation portion 81 and the liquid refrigerant storage portion 82 are integrated. For example, as shown in FIGS. 5A and 5B, the axial center of the gas-liquid separation portion 81 and the axial center of the liquid refrigerant storage portion 82 can be offset from each other by a dimension B. That is, the axial center of the liquid refrigerant storage portion 82 is offset from the same plan as the axial center of the gas-liquid separation portion 81 toward a vehicle front side.

Specifically, the gas-liquid separator 8 is mounted in the vehicle such that the gas-liquid separation portion 81 is arranged at the one side of the condenser 3 and the liquid refrigerant storage portion 82 is arranged at the front surface side of the condenser 3. In this case, the dimension of gas-liquid separator 8 in the vehicle front-rear direction becomes larger by the dimension of the liquid refrigerant storage portion 82, as compared with the dimension of the gas-liquid separator 8 in the first embodiment. However, even in this case, because the gas-liquid separation portion 81 is overlapped with the condenser 3 in the vehicle front-rear direction, the mounting space for mounting the gas-liquid separator 8 in the engine compartment can be made smaller in the vehicle front-rear direction. Therefore, the gas-liquid separator 8 can be mounted in the engine compartment without interfering with the crushable zone on the vehicle front side and the vehicle reinforcing member, and the mounting performance of the gas-liquid separator 8 can be improved.

In the second embodiment, the other parts are similar to those of the above-described first embodiment.

Third Embodiment

Figure 6A:
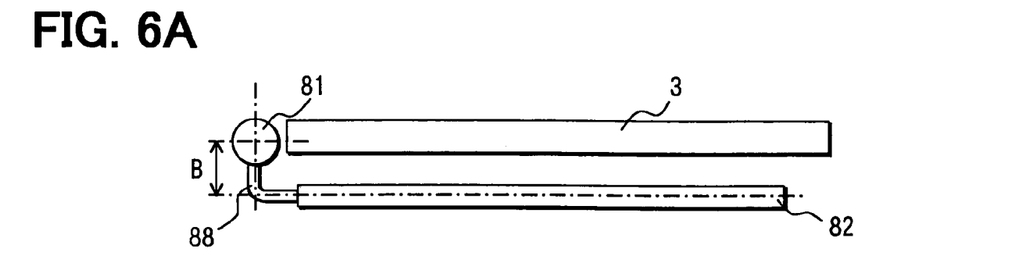
FIG. 6A and FIG. 6B are a top view and a front view showing a mounting state of a gas-liquid separator according to a third embodiment of the present invention.
Figure 6B:
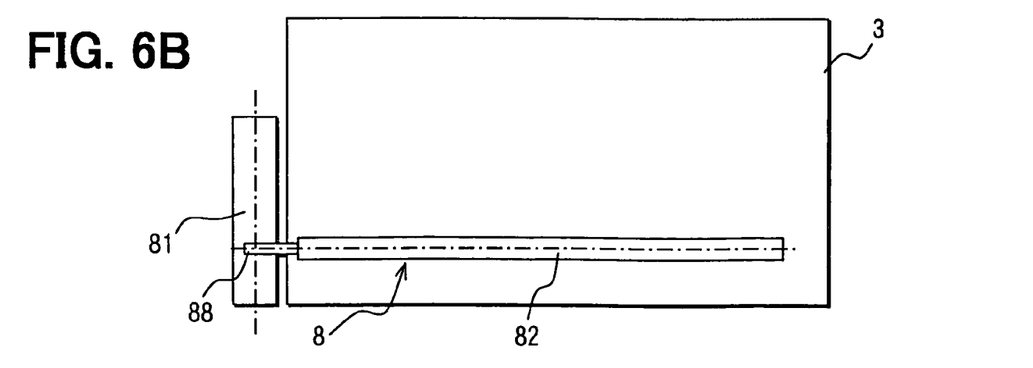

The third embodiment of the present invention will be now described with reference to FIGS. 6A and 6B. In the above-described first and second embodiments, the gas-liquid separation portion 81 and the liquid refrigerant storage portion 82 are directly bonded to be integrated with each other, in the gas-liquid separator 8. However, in the third embodiment, as shown in FIGS. 6A and 6B, the one end portion 82a of the liquid refrigerant storage portion 82 and the lower end portion 81a of the gas-liquid separation portion 81 are integrated through a communication member 88. In this case, an axial offset dimension (i.e., the dimension B) between the axial centers of the gas-liquid separation portion 81 and the liquid refrigerant storage portion 82 can be readily adjusted by the communication member 88. Therefore, the gas-liquid separator 8 can be readily mounted in the engine compartment.

In the third embodiment, the other parts are similar to those of the above-described first embodiment.

Fourth Embodiment

Figure 7:
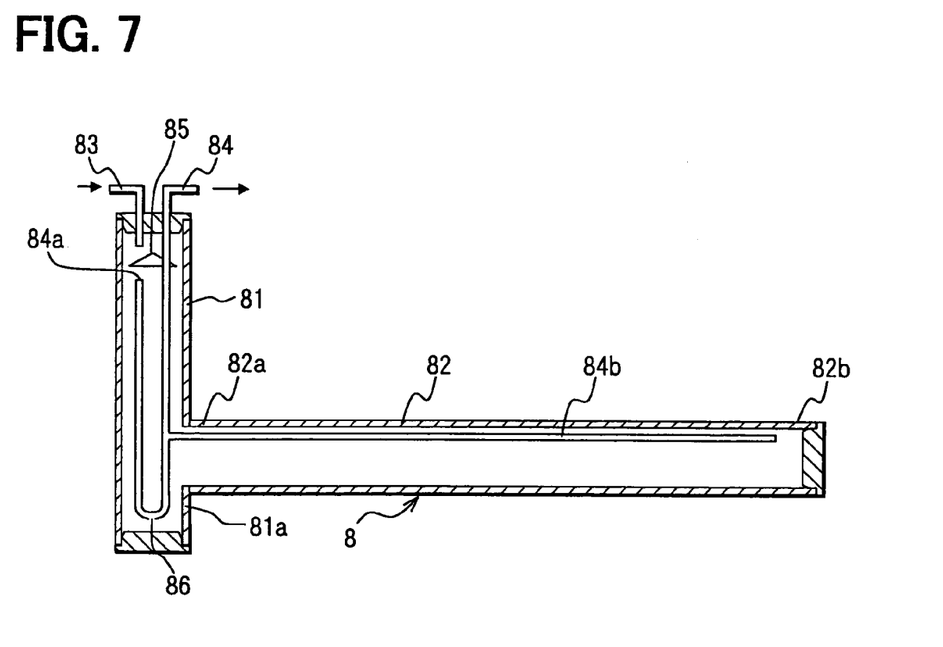
FIG. 7 is a vertical sectional view showing an entire structure of a gas-liquid separator according to a fourth embodiment of the present invention.

The fourth embodiment of the present invention will be now described with reference to FIG. 7. In the fourth embodiment, a communication pipe 84b extending in the extending direction of the liquid refrigerant storage portion 82 is connected to the gas refrigerant outlet portion 84 to communicate with the gas refrigerant outlet portion 84. The communication pipe 84b extends within the liquid refrigerant storage portion 82 approximately in parallel with the top end of the liquid refrigerant storage portion 82 at a position proximate to the top end of the liquid refrigerant storage portion 82 to be opened at a top side of the other end portion 82b of the liquid refrigerant storage portion 82.

In the fourth embodiment, it is possible to introduce the separated gas refrigerant into the gas refrigerant outlet portion 84 from the opening of the communication pipe 84b. In the fourth embodiment, the other parts air similar to those of the above-described first embodiment.

Fifth Embodiment

In the above-described first to fourth embodiments, the gas-liquid separator 8 of the present invention is used for the refrigerant cycle system having the general decompression device 4 that is a fixed throttle or a variable throttle. However, in the fifth embodiment, a gas-liquid separator 8 of the present invention is used for a refrigerant cycle system. (ejector cycle system) in which an ejector 4a is used instead of the decompression device 4.

Figure 8:
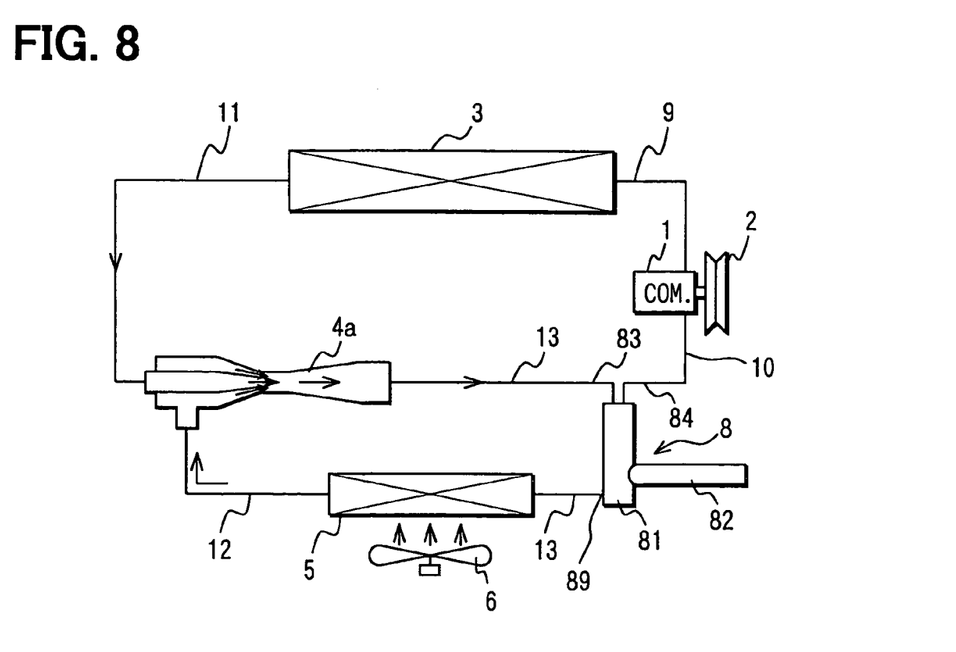
FIG. 8 is a schematic diagram showing a refrigerant cycle system (ejector-cycle system) in which a gas-liquid separator according to a fifth embodiment of the present invention is used.

As shown in FIG. 8, the ejector 4a decompresses refrigerant flowing from the condenser 3, and sucks gas refrigerant evaporated in the evaporator 5 by a high-speed refrigerant flow jetted from a nozzle of the ejector 4a so that expansion energy is converted to the pressure energy and a suction pressure of the refrigerant to be sucked into the compressor 1 is increased. Therefore, an inlet port of the nozzle of the ejector 4a is connected to the outlet side of the condenser 3, a suction port of the ejector 4a is connected to the outlet of the evaporator 5, and an outlet port of the ejector 4a is connected to the refrigerant inlet portion 83 of the gas-liquid separator 8.

Figure 9:
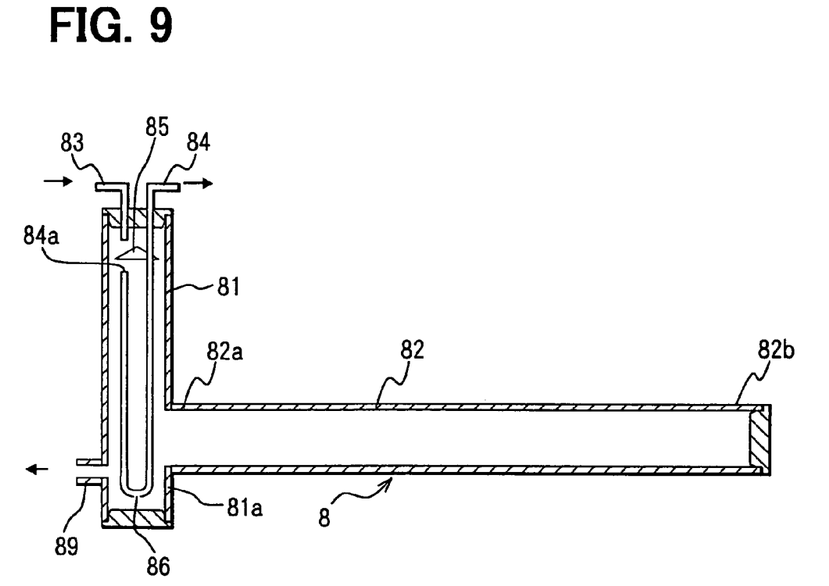
FIG. 9 is a vertical sectional view showing an entire structure of an example of a gas-liquid separator according to the fifth embodiment of the present invention.

Further, an inlet side of the evaporator 5 is connected to the gas-liquid separator 8 so that the separated liquid refrigerant in the gas-liquid separator 8 is introduced into the evaporator 5. A liquid refrigerant outlet portion 89 through which the separated liquid refrigerant flows toward the evaporator 5 is provided in the gas-liquid separator 8. As shown in FIG. 9, the liquid refrigerant outlet portion 89 is formed in the lower end portion 81a of the gas-liquid separation portion 81 to be positioned around the bottom end of the liquid refrigerant storage portion 82 or lower than the bottom end of the liquid refrigerant storage portion 82. Accordingly, the separated liquid refrigerant in the gas-liquid separator 8 can be certainly sucked into the evaporator 5 through the liquid refrigerant outlet portion 89.

Figure 10:
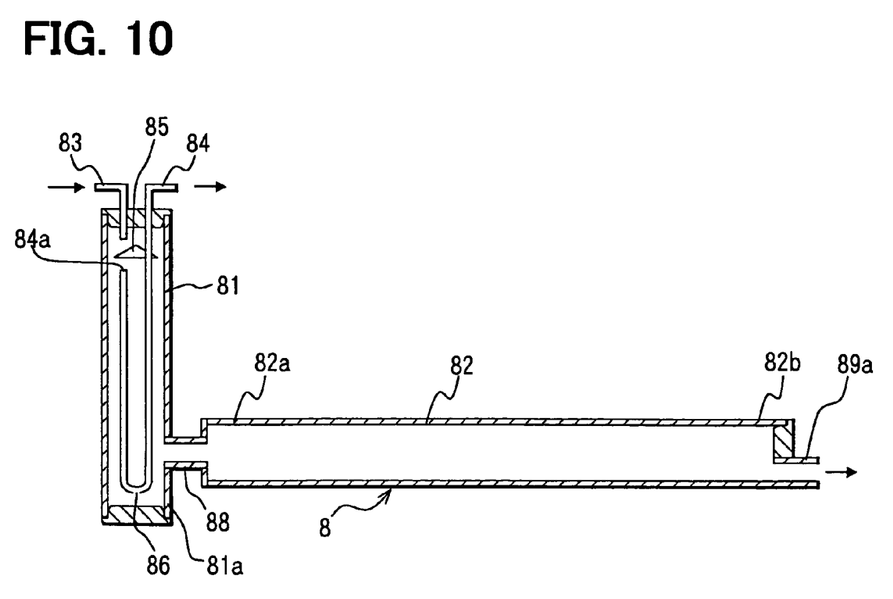
FIG. 10 is a vertical sectional view showing an entire structure of another example of the gas-liquid separator according to the fifth embodiment of the present invention.

In the example of FIG. 9, the liquid refrigerant outlet portion 89 is formed in the lower end portion 81a of the gas-liquid separation portion 81 at a position around the bottom end of the liquid refrigerant storage portion 82 or lower than the bottom end of the liquid refrigerant storage portion 82. However, as shown in FIG. 10, a liquid refrigerant outlet portion 89a is formed at a lower end side of the other end portion 82b of the liquid refrigerant storage portion 82. Even in, this case, the separated liquid refrigerant in the gas-liquid separator 8 can be certainly sucked into the evaporator 5 through the liquid refrigerant outlet portion 89a.

Sixth Embodiment

Figure 11:
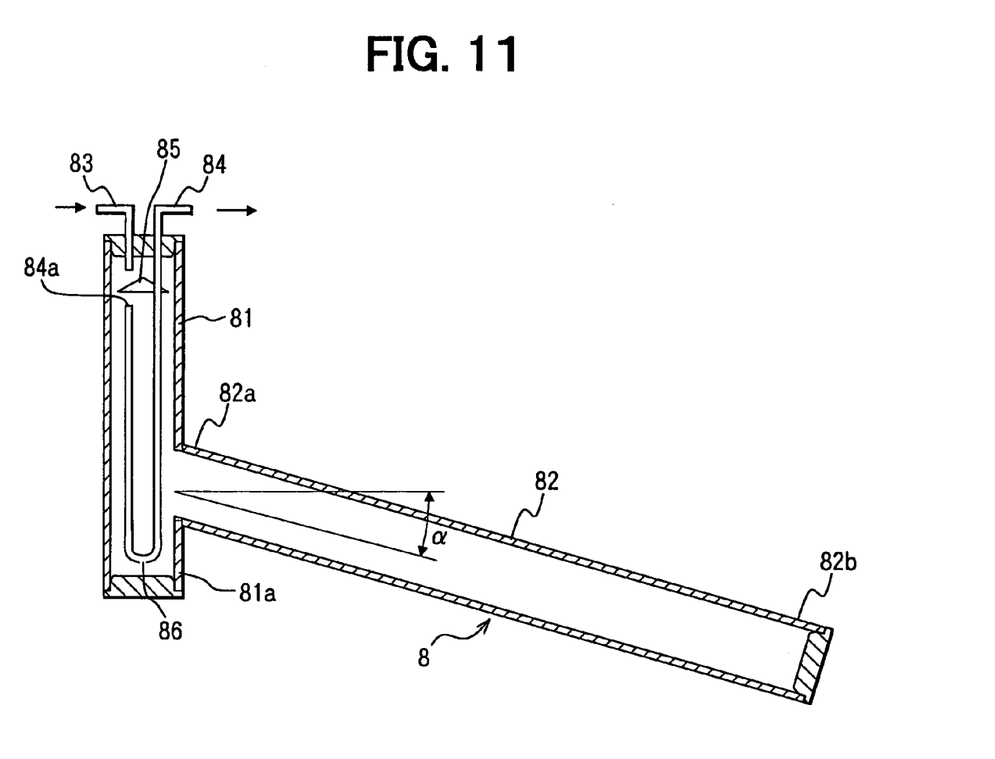
FIG. 11 is a vertical sectional view showing an entire structure of a gas-liquid separator according to a sixth embodiment of the present invention.

In the above-described embodiments, the liquid refrigerant storage portion 82 is approximately horizontally arranged with respect to the gas-liquid separation portion 81 that is arranged approximately vertically. However, in the sixth embodiment, as shown in FIG. 11, the liquid refrigerant storage portion 82 is tilted to a lower side from the horizontal surface by a predetermined angle α (e.g., 15°), with respect to the approximately vertically arranged gas-liquid separation portion 81. In this case, gas refrigerant is not stored in the liquid refrigerant storage portion 82, and the necessary height H for the gas-liquid separation in the approximately vertically arranged gas-liquid separation portion 81 can be made smaller. Further, it can prevent the liquid refrigerant from being introduced into the gas refrigerant outlet portion 84 from the opening portion 84a.

In the sixth embodiment, the liquid refrigerant outlet portion 89, 89a described in the fifth embodiment can be provided in the gas-liquid separator 8 shown in FIG. 11.

Although the present invention has been fully described in connection with the preferred embodiments thereof with reference to the accompanying drawings, it is to be noted that various changes and modifications will become apparent to those skilled in the art.

For example, in the above-described embodiments, as the refrigerant in the refrigerant cycle system or the ejector cycle system, a general refrigerant such as carbon dioxide, Freon, a carbon hydride refrigerant or the other refrigerant can be used. For example, when carbon dioxide is used as the refrigerant, the pressure of refrigerant discharged from the compressor 1 can be increased more than the critical pressure of the refrigerant. In this case, the condenser 3 in the refrigerant cycle system or the ejector cycle system is used as a cooler in which the refrigerant is cooled without a phase change.

In the above-described embodiments, the compressor 1 is driven by a vehicle engine through the electromagnetic clutch 2. However, the compressor 1 can be driven by a driving unit such as an electrical motor.

In the above-described embodiments, the gas-liquid separator 8 of the present invention is used for an accumulator arranged at a refrigerant suction side of the compressor 1 in the refrigerant cycle system having the decompression device 4 or the ejector 4a. However, the gas-liquid separator 8 of the present invention can be used for the other type refrigerant cycle system.

Such changes and modifications are to be understood as being within the scope of the present invention as defined by the appended claims.

What is claimed is:

1. A gas-liquid separator for a refrigerant cycle system of a vehicle, the gas-liquid separator comprising:
a gas-liquid separation portion disposed substantially vertically for separating refrigerant flowing therein into gas refrigerant and liquid refrigerant;
a gas refrigerant outlet portion defining an opening for gas-refrigerant and an oil returning hole in the gas-liquid separation portion; and
a liquid refrigerant storage portion which stores the liquid refrigerant separated by the gas-liquid separation portion, wherein
the liquid refrigerant storage portion is disposed such that the liquid refrigerant is generally horizontally stored in the liquid refrigerant storage portion with respect to the gas-liquid separation portion disposed substantially vertically; wherein
the gas-liquid separation portion is disposed at a suction side of a compressor of the refrigerant cycle system mounted on the vehicle;
one end portion of the liquid refrigerant storage portion is integrally connected to a lower end portion of the gas-liquid separation portion in a manner that the gas-liquid separation portion defines a cup-shaped bottom end part extended below a connecting opening for the liquid refrigerant storage portion; and
the oil returning hole is located in the cup-shaped bottom end part and opens below the connecting opening for the liquid refrigerant storage portion.

2. The gas-liquid separator according to claim 1, wherein:
the gas-liquid separation portion is provided to have a gas-liquid separation necessary height H in an extending direction of the gas-liquid separation portion;
the liquid refrigerant storage portion has a total length L in an extending direction of the liquid refrigerant storage portion; and
the necessary height H of the gas-liquid separation portion and the total length L of the liquid refrigerant storage portion are set to have the following relationship of $H \times \cos\theta \geq L \times \tan\theta$, in which $\theta$ is a slant angle of the vehicle.

3. The gas-liquid separator according to claim 1, wherein the gas-liquid separation portion has an axial center that is shifted from that of the liquid refrigerant storage portion in a vehicle front-rear direction.

4. The gas-liquid separator according to claim 3, wherein the gas-liquid separation portion is arranged adjacent to a side surface of a condenser that is provided at a discharge side of the compressor, and
the liquid refrigerant storage portion is arranged on a front side of the condenser.

5. The gas-liquid separator according to claim 1, further comprising
a communication member through which the one end portion of the liquid refrigerant storage portion communicates with the lower end portion of the gas-liquid separation portion, wherein the gas-liquid separation portion and the liquid refrigerant storage portion are integrated through the communication member.

6. The gas-liquid separator according to claim 5, wherein
the gas-liquid separation portion is arranged adjacent to a side surface of a condenser that is provided at a discharge side of the compressor, and
the liquid refrigerant storage portion is arranged on a front side of the condenser.

7. The gas-liquid separator according to claim 1, wherein
the gas-liquid separation portion is arranged on one side of a side surface of a condenser that is provided at a discharge side of the compressor in the refrigerant cycle system, and
the liquid refrigerant storage portion is arranged on a bottom surface side of the condenser.

8. The gas-liquid separator according to claim 1, wherein:
the gas-liquid separation portion has a gas refrigerant outlet portion through which gas refrigerant separated in the gas-liquid separation portion flows to the suction side of the compressor; and
the gas refrigerant outlet portion is provided to communicate with a top end side of the other end portion of the liquid refrigerant storage portion.

9. The gas-liquid separator according to claim 1, wherein
the refrigerant cycle system includes an evaporator for evaporating liquid refrigerant from the gas-liquid separation portion, and an ejector for decompressing refrigerant while sucking gas refrigerant evaporated in the evaporator,
the gas-liquid separator further comprising
a liquid refrigerant outlet portion through which the liquid refrigerant separated in the gas-liquid separation portion is introduced into the evaporator, wherein
the liquid refrigerant outlet portion is provided in the gas-liquid separation portion to be positioned around a bottom end of the liquid refrigerant storage portion or lower than the bottom end of the liquid refrigerant storage portion.

10. The gas-liquid separator according to claim 1, wherein
the refrigerant cycle system includes an evaporator for evaporating liquid refrigerant from the gas-liquid separation portion, and an ejector for decompressing refrigerant while sucking gas refrigerant evaporated in the evaporator,
the gas-liquid separator further comprising
a liquid refrigerant outlet portion through which the liquid refrigerant in the liquid refrigerant storage portion is introduced into the evaporator, wherein
the liquid refrigerant outlet portion is provided at a lower end portion of the liquid refrigerant storage portion.

11. A gas-liquid separator for a refrigerant cycle system of a vehicle, the gas-liquid separator comprising:
a gas-liquid separation portion disposed substantially vertically for separating refrigerant flowing therein into gas refrigerant and liquid refrigerant;
a gas refrigerant outlet portion defining an opening for gas-refrigerant and an oil returning hole in the gas-liquid separation portion; and
a liquid refrigerant storage portion which stores the liquid refrigerant separated by the gas-liquid separation portion, wherein
the liquid refrigerant storage portion extends in an extension direction tilted lower by a predetermined angle from a horizontal direction, with respect to the gas-liquid separation portion disposed substantially vertically;
the gas-liquid separation portion is disposed at a suction side of a compressor of the refrigerant cycle system mounted on the vehicle; wherein
one end portion of the liquid refrigerant storage portion is integrally connected to a lower end portion of the gas-liquid separation portion in a manner that the gas-liquid separation portion defines a cup-shaped bottom end part extended below a connecting opening for the liquid refrigerant storage portion; and
the oil returning hole is located in the cup-shaped bottom end part and opens below the connecting opening for the liquid refrigerant storage portion.

12. The gas-liquid separator according to claim 11, wherein the predetermined angle is equal to or lower than 15°.

13. The gas-liquid separator according to claim 1, wherein the gas-liquid separation portion includes a straight tank part having a uniform cross-sectional area over its entire length and the liquid refrigerant storage portion includes a straight tank part that is generally perpendicular to the straight tank part of the gas-liquid separation portion and has a uniform cross-sectional area over its entire length.

* * * * *